US010800704B2

(12) United States Patent
Ziehl et al.

(10) Patent No.: US 10,800,704 B2
(45) Date of Patent: Oct. 13, 2020

(54) FLY ASH-BASED GEOPOLYMER CONCRETE AND METHOD OF FORMATION

(71) Applicant: UNIVERSITY OF SOUTH CAROLINA, Columbia, SC (US)

(72) Inventors: Paul Henry Ziehl, Irmo, SC (US); Lateef Assi, Cayce, SC (US)

(73) Assignee: University of South Carolina, Columbia, SC (US)

( * ) Notice: Subject to any disclaimer, the term of this patent is extended or adjusted under 35 U.S.C. 154(b) by 108 days.

(21) Appl. No.: 16/127,496

(22) Filed: Sep. 11, 2018

(65) Prior Publication Data

US 2019/0092688 A1 Mar. 28, 2019

Related U.S. Application Data

(60) Provisional application No. 62/563,263, filed on Sep. 26, 2017.

(51) Int. Cl.
*C04B 28/04* (2006.01)
*C04B 40/00* (2006.01)
*C04B 18/14* (2006.01)
*C04B 22/06* (2006.01)
*C04B 28/00* (2006.01)

(52) U.S. Cl.
CPC ............ *C04B 28/04* (2013.01); *C04B 18/146* (2013.01); *C04B 22/062* (2013.01); *C04B 28/006* (2013.01); *C04B 40/0046* (2013.01)

(58) Field of Classification Search
CPC ..... C04B 18/146; C04B 22/062; C04B 28/04; C04B 28/006; C04B 40/0046
See application file for complete search history.

(56) References Cited

U.S. PATENT DOCUMENTS

| 4,210,457 A | 7/1980 | Dodson et al. | |
|---|---|---|---|
| 4,640,715 A * | 2/1987 | Heitzmann | C04B 28/006 106/706 |
| 5,490,889 A * | 2/1996 | Kirkpatrick | C04B 28/02 106/705 |
| 7,442,248 B2 * | 10/2008 | Timmons | C04B 28/021 106/705 |
| 2016/0244366 A1 * | 8/2016 | Turcinskas | C04B 28/006 |

FOREIGN PATENT DOCUMENTS

| CN | 104609778 A | * | 5/2015 |
|---|---|---|---|
| KR | 101288349 B1 | * | 7/2013 |

OTHER PUBLICATIONS

Abdullah, et al, "Chemical Reactions in the Geopolymerisation Process Using Fly Ash-Based Geopolymer: A Review." *Journal of Applied Sciences Research*, 7(7), (2011), pp. 1199-1203.

Al Bakri, et al. "Microstructure of different NaOH molarity of fly ash-based green polymeric cement," 3 (2011), pp. 44-49.
American Concrete Institute, Standard Practice for Selecting Proportions for Normal, Heavyweight, and Mass Concrete [211.1-91: Standard Practice for Selecting Proportions for Normal, Heavyweight, and Mass Concrete (Reapproved 2009)], American Concrete Institute Committee 211, 1997.
Assi, et al, "Investigation of early compressive strength of fly ash-based geopolymer concrete." *Construction and Building Materials*, 112, (2016), pp. 807-815.
Bakharev, Durability of geopolymer materials in sodium and magnesium sulfate solutions, *Cem. Concr. Res.* 35 (2005), pp. 1233-1246.
Castro, et al., "Portland Cement Concrete Pavement Permeability Performance," *INDOT Research Technical Summary*, JTRP-2010/29, (2010), pp. 1-258.
Chen, et al. "Environmental impact of cement production: detail of the different processes and cement plant variability evaluation." *Journal of Cleaner Production*, 18(5), (2010), pp. 478-485.
Chindaprasirt, et al., "Effect of sodium hydroxide concentration on chloride penetration and steel corrosion of fly ash-based geopolymer concrete under marine site," *Constr. Build. Mater* 63 (2014), pp. 303-310. (Abstract only).
Chotard, et al, "Analysis of acoustic emission signature during aluminous cement setting to characterise the mechanical behaviour of the hard material." *Journal of the European Ceramic Society*, 25(16), (2005), pp. 3523-3531.
Chotard, et al., "Acoustic emission characterisation of calcium aluminate cement hydration at an early stage." *Journal of the European Ceramic Society*, 23(3), (2003), pp. 387-398.
Chotard, et al., "Characterisation of early stage calcium aluminate cement hydration by combination of non-destructive techniques: Acoustic emission and X-ray tomography." *Journal of the European Ceramic Society*, 23(13), (2003), pp. 2211-2223.
Davidovits, J., "Properties of Geopolymer Cements." *First International Conference on Alkaline Cements and Concretes*, (1994), pp. 131-149.
De Silva, et al., "Kinetics of geopolymerization: Role of Al2O3 and SiO2." *Cement and Concrete Research*, 37(4), (2007), pp. 512-518.
Diaz, et al. Factors affecting the suitability of fly ash as source material for geopolymers, *Fuel*, 89 (2010), pp. 992-996.
Duxson, et al., "Geopolymer technology: The current state of the art." *Journal of Materials Science*, 42(9), (2007), pp. 2917-2933.
Duxson, et al., "The role of inorganic polymer technology in the development of 'green concrete'" *Cement and Concrete Research*, 37(12), (2007), pp. 1590-1597.

(Continued)

Primary Examiner — Anthony J Green
(74) Attorney, Agent, or Firm — Dority & Manning, P.A.

(57) ABSTRACT

Fly ash-based geopolymer binders and activating solutions for use in forming a concrete as well as methods for forming concrete including the binders are described. The fly ash-based geopolymer binders include a combination of fly ash, silica fume, and sodium hydroxide as well as an amount of Portland cement. Concretes formed of the binders can exhibit excellent compressive strength and fuel energy characteristics as well as being more cost efficient as compared to other concretes. The inclusion of an amount of Portland cement in the binders can allow for a decrease in sodium hydroxide and silica fume content while maintaining desirable compressive strength characteristics.

19 Claims, 10 Drawing Sheets

(56) References Cited

OTHER PUBLICATIONS

Fernández-Jiménez, et al., "Characterisation of fly ashes. Potential reactivity as alkaline cements." *Fuel*, 82(18), (2003), pp. 2259-2265.
Goodarzi, "Characteristics and composition of fly ash from Canadian coalfired power plants," *Fuel*, 85 (2006), pp. 1418-1427. (Abstract only).
Hardjito, et al., "On the development of fly ash-based geopolymer concrete." *ACI Materials Journal*, 101(6), (2004), pp. 467-472.
Hasanbeigi, et al., "The CO2 abatement cost curve for the Thailand cement industry." *Journal of Cleaner Production*, 18(15), (2010), pp. 1509-1518.
Hester, et al., "A study of the influence of slag alkali level on the alkali-silica reactivity of slag concrete," *Constr. Build. Mater.*, 19, (2005), pp. 661-665.
Hu, et al., "Bonding and abrasion resistance of geopolymeric repair material made with steel slag," *Cem. Concr. Compos.*, 30, (2008), pp. 239-244.
Jambunathan, et al., "The role of alumina on performance of alkali-activated slag paste exposed to 50 C," *Cem. Concr. Res.*, 54, (2013), pp. 143-150.
Khale, et al., "Mechanism of geopolymerization and factors influencing its development: A review." *Journal of Materials Science*, 42(3), (2007), pp. 729-746.
Kong, et al., "Damage behavior of geopolymer composites exposed to elevated temperatures," *Cem. Concr. Compos.*, 30, (2008), pp. 986-991.
Lloyd, et al., "Geopolymer Concrete with Fly Ash." *Second International Conference on Sustainable Construction Materials and Technologies*, 3 (010), pp. 1493-1504.
Lura, et al., "Early-age acoustic emission measurements in hydrating cement paste: Evidence for cavitation during solidification due to self-desiccation." *Cement and Concrete Research*, 39(10), (2009), pp. 861-867.
McLellan, et al., "Costs and carbon emissions for geopolymer pastes in comparison to ordinary Portland cement," *J. Clean. Prod.* 19 (2011) 1080-1090.
Mishra, et al., "Effect of concentration of alkaline liguid and curing time on strength and water absorption of geopolymer concrete, ARPN," *J. Eng. Appl. Sci.*, 3, (2008), pp. 14-18.
Nath, et al., "Early age properties of low-calcium fly ash geopolymer concrete suitable for ambient curing," *Proc. Eng.*, 125, (2015), pp. 601-607.
Olivia, et al., "Properties of fly ash geopolymer concrete designed by Taguchi method," *Mater. Des.*, 36, (2012), pp. 191-198.
Pacheco-Torgal, et al., "Alkali-activated binders: A review. Part I. Historical background, terminology, reaction mechanisms and hydration products." *Construction and Building Materials*, 22(7), (2008), pp. 1305-1314.
Palomo, et al., "Alkali-activated fly ashes: A cement for the future." *Cement and Concrete Research*, 29(8), (1999), pp. 1323-1329.
Pan, et al., "Factors influencing softening temperature and hotstrength of geopolymers," *Cem. Concr. Compos.* 34, (2012), pp. 261-264.
Pazdera, et al., "Advanced Analysis of Acoustic Emission Parameters during the Concrete Hardening for Long Time." *11th European Conference on Non-Destructive Testing*, (Ecndt), 2014.
Rangan, B. "Fly Ash-Based Geopolymer Concrete," *Int. Work. Geopolymer Cem. Concr.* (2010), pp. 68-106.
Sayers, et al., "Propagation of ultrasound through hydrating cement pastes at early times." *Advanced Cement Based Materials*, 1(1), (1993), pp. 12-21.
Sindhunata, et al., "Effect of curing temperature and silicate concentration on fly-ash-based geopolymerization," *Ind. Eng. Chem. Res.*, 45, (2006), pp. 3559-3568.
Sumajouw, et al., "Fly ash-based geopolymer concrete: Study of slender reinforced columns." *Journal of Materials Science*, 42(9), (2007), pp. 3124-3130.
Tempest, et al., "Compressive strength and embodied energy optimization of fly ash based geopolymer concrete," *World* (2009), pp. 1-17.
Van Den Abeele, et al., "Active and passive monitoring of the early hydration process in concrete using linear and nonlinear acoustics." *Cement and Concrete Research*, 39(5), (2009), pp. 426-432.
Van Deventer, et al., "Technical and commercial progress in the adoption of geopolymer cement," *Miner. Eng.*, 29, (2012), pp. 89-104.
Van Jaarsveld, et al., "The potential use of geopolymeric materials to immobilize toxic metals: Part 1. theory and application." *Minerals Engineering*, 10(7), (2004), pp. 201-251.
Vijai, et al., "Effect of types of curing on strength of geopolymer concrete," *Int. J. Phys. Sci.*, 5, (2010), pp. 1419-1423.
Wallah, S.E., "Creep Behaviour of Fly Ash-Based Geopolymer Concrete." *Civil Engineering*, 12(2), (2011), pp. 73-78.
Wallah, S.E., "Drying Shrinkage of Heat-Cured Fly Ash-Based Geopolymer-Concrete." *CCSE journal*, 3(12), (2000), pp. 14-21.
Yip, et al., "Effect of calcium silicate sources on geopolymerisation," *Cem. Concr. Res.*, 38, (2008), pp. 554-564.
Yusuf, et al., "Influence of curing 423 methods and concentration of NaOH on strength of the synthesized alkaline activated ground slag-ultrafine palm oil fuel ash mortar/concrete," *Constr. Build. Mater.*, 66, (2014), pp. 541-548. (Abstract only).

\* cited by examiner

FLY ASH-BASED GEOPOLYMER CONCRETE AND METHOD OF FORMATION

CROSS REFERENCE TO RELATED APPLICATION

This application claims filing benefit of U.S. Provisional Patent Application Ser. No. 62/563,263 having a filing date of Sep. 26, 2017, which is incorporated herein by reference for all purposes.

BACKGROUND

Portland cement has traditionally been a vital material for the fabrication of concrete components. This paradigm may change in the future, however, as the production of cement requires a vast amount of energy while simultaneously releasing large amounts of $CO_2$. To address these issues, alternative materials have been sought. Ideally, an alternative product will reduce or eliminate the Portland cement component of concrete while demonstrating equal or improved properties.

Joseph Davidovits proposed in the 1980s that an alkaline liquid could be used to react with silicon and aluminum in a source material to produce alternative binders to traditional cements. Proposed source materials were of geological origin or by-product materials such as fly ash, blast furnace slag, and rice husk ash. Because the chemical reaction that takes place is a polymerization process, the term 'geopolymer' was coined to represent these binders.

Geopolymers are inorganic polymers having a chemical composition that is similar to natural zeolite materials, but the microstructure is amorphous. The polymerization formation process involves a substantially fast chemical reaction under alkaline condition on Si/Al minerals, resulting in a three-dimensional polymeric chain and ring structure of Si—O/Al—O bonds. These alkali-activated cements show promise in replacement of Portland cements. Alkali activated geopolymers can not only greatly reduce or eliminate the use of Portland cement, thereby decreasing $CO_2$ emissions, but they can utilize significant quantities of materials such as fly ash that have traditionally been considered waste.

Fly ash-based geopolymer concrete binder includes fly ash as silica and alumina source and utilizes an activating solution that includes a mixture of sodium hydroxide, sodium silicate, and water. Geopolymer concretes include fine and coarse aggregate as known for other concretes. Studies of typical fly ash-based geopolymer concretes indicate that the materials can have significant resistance to acid and sulfate attack, high early compressive strength, and good performance under high temperatures.

The most expensive components in fly ash-based geopolymer concrete are the sodium hydroxide of the activating solution. Unfortunately, the need for external heat during the curing process largely limits fly ash-based geopolymer concrete applications to prestressed and precast concrete applications.

There is a recognized need for sustainable concrete. Fly ash-based geopolymer concrete is of interest; however, the costs, long term strength characteristics, and need for external heat during cure limit applications. What are needed in the art are fly ash-based geopolymer concretes and methods of forming fly ash-based geopolymer concrete that can address strength needs as well as formation costs of these sustainable materials.

SUMMARY

According to one embodiment, disclosed is a fly ash-based geopolymer concrete binder that includes fly ash, Portland cement, sodium hydroxide, and silica fume. The concrete binder can include sodium hydroxide in an amount of from about 5% to about 13% by weight of the fly ash (e.g., from about 15 kg/m$^3$ to about 105 kg/m$^3$ of the concrete) and silica fume in an amount of from about 4% to about 10% by weight of the fly ash (e.g., from about 10 kg/m$^3$ to about 50 kg/m$^3$ of the concrete). The binder can also include an amount of Portland cement. In general, the weight ratio of the fly ash to the Portland cement can be from about 95:5 to about 65:35 (e.g., about 10 kg/m$^3$ to about 200 kg/m$^3$ Portland cement in the concrete).

Also disclosed is a fly ash-based geopolymer concrete formed with the binder, i.e., a concrete including the cured binder including the reaction product of fly ash, sodium hydroxide, silica fume and Portland cement in conjunction with aggregate, for instance a mixture of fine aggregate and coarse aggregate. For example, the formed concrete can include the fly ash in an amount of from about 300 kg/m$^3$ to about 500 kg/m$^3$. The concrete can exhibit excellent compressive strength and fuel energy characteristics. For instance, the concrete can have a 28-day compressive strength (as determined according to ASTM C39) of about 15 MPa or greater (e.g., from about 20 MPa to about 65 MPa) and can have a fuel usage (also referred to as thermal energy herein) of about 0.5 GJ/m$^3$ or greater (for instance from about 1 GJ/m$^3$ to about 1.65 GJ/m$^3$).

A method for forming the fly ash-based geopolymer concrete is also described. For instance, a method can include combining the sodium hydroxide (e.g. sodium hydroxide flakes) and silica fume powder as binder components with water to form an activating solution, combining the activating solution with fly ash and Portland cement to form a binder paste, and combining the binder paste with aggregate. The concrete can then be cured at ambient conditions. Beneficially, due to ambient cure conditions, the formation can be carried out in situ at the site of utilization and is not limited to pre-cast or prestressed concrete applications. Moreover, the ambient cure conditions, reduction in amount of sodium hydroxide as compared to previously known concretes, inclusion of silica fume, and inclusion of an amount of Portland cement can provide the concrete at lower cost as compared to other fly ash-based geopolymer concretes.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
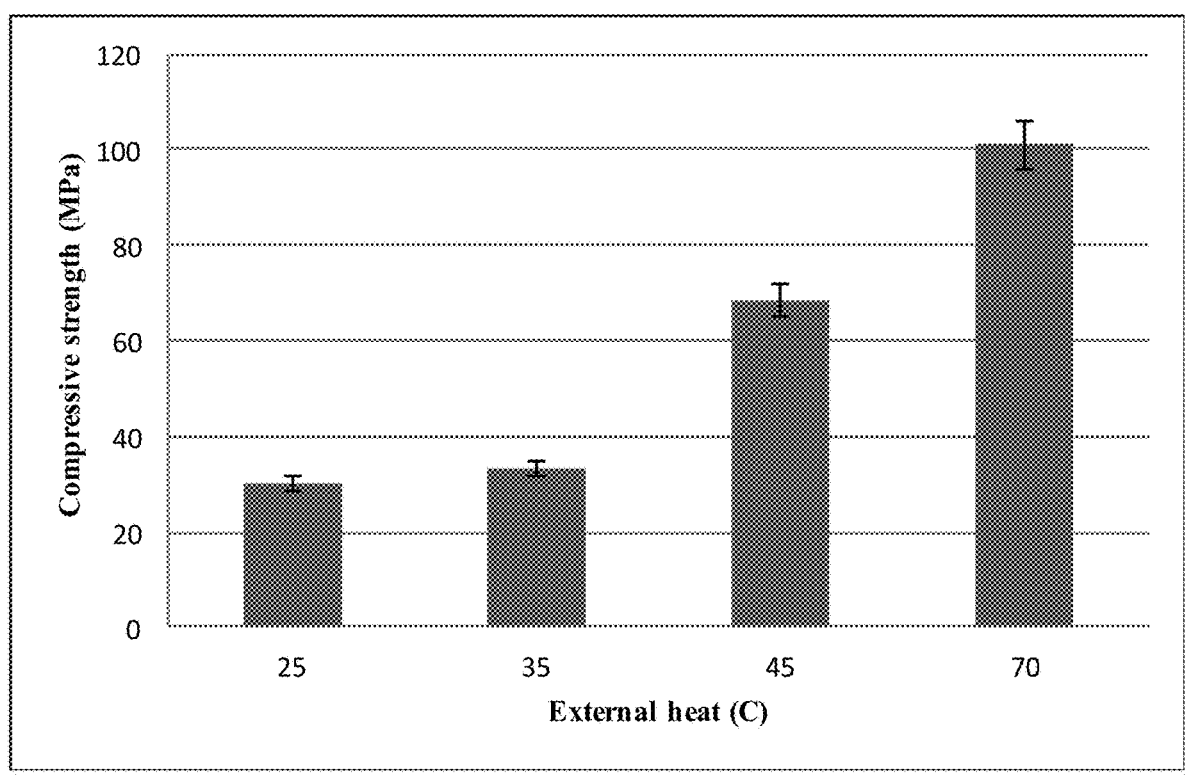
FIG. 1 presents the effect of external heat on the compressive strength at seven days of concrete formed with an activating solution as described.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is generally directed to fly ash-based geopolymer binders and activating solutions for use in forming a concrete as well as methods for forming concrete including the binders. More specifically, the fly ash-based geopolymer binders include a combination of fly ash, silica fume, and sodium hydroxide as well as an amount of Portland cement.

Concretes formed of the binders can exhibit excellent compressive strength and fuel energy characteristics as well as being more cost efficient as compared to other concretes. For example, the inclusion of an amount of Portland cement in the binders can allow for a decrease in sodium hydroxide content while maintaining desirable compressive strength characteristics. As sodium hydroxide is one of the major contributing factors to geopolymer concrete costs, this can provide significant savings. Moreover, concrete that incorporates the binders can be cured at ambient conditions, with no external heat source necessary to form a product concrete having desirable compressive strength characteristics. This can not only lead to significant savings but can also allow for in situ cure at the final site of utilization of the concrete, which has not been possible in the past for geopolymer concretes.

Concretes formed with the binders can have desirable compressive strengths. For instance, a concrete can have a 28-day compressive strength as determined according to ASTM C39 of about 15 MPa or greater, for instance, from about 20 MPa to about 65 MPa, from about 50 MPa to about 65 MPa, or from about 15 MPa to about 30 MPa, in some embodiments. A concrete can have a 7-day compressive strength as determined according to ASTM C39 of about 10 MPa or greater, for instance from about 10 MPa to about 60 MPa, or from about 15 MPa to about 25 MPa in some embodiments. A concrete can have a 3-day compressive strength as determined according to ASTM C39 of from about 5 MPa to about 15 MPa and can have a 1-day compressive strength as determined according to ASTM C39 of from about 3 MPa to about 5 MPa, in some embodiments.

The fuel usage of concretes (i.e., the energy necessary to form the concrete, excluding the energy required for producing the aggregate component of the concrete) formed by use of the disclosed fly ash-based geopolymer binders can also be of a highly desirable value. For instance, the fuel usage of the concrete can be about 0.5 $GJ/m^3$ or greater, for instance from about 0.6 $GJ/m^3$ to about 1.65 $GJ/m^3$ in some embodiments. In some embodiments, the fuel usage of the concretes can be about 1 $GJ/m^3$ or greater, for instance from about 1.2 $GJ/m^3$ to about 1.5 $GJ/m^3$.

Fuel usage can be determined according to standard methods by use of values obtained in the literature. For instance, typical reference energy values that can be utilized are described in Table 1, below.

TABLE 1

| Raw materials | Amount, $kg/m^3$ ($lb/ft^3$) | Required energy, GJ |
| --- | --- | --- |
| Cement Type I | 475 (29.8) | 2.35 |
| Silica fume | 46.2 (2.90) | 0.00 |
| Fly ash (type F) | 474 (29.6) | 0.00 |
| Sodium hydroxide | 61.6 (3.80) | 1.26 |
| Curing under 75.0° C. (167° F.) for 48 hrs | — | 0.13 |
| Heat of activating to 75.0° C. (167° F.) solution (167° F.) | — | 0.05 |
| Heat the concrete to 75.0° C. (167° F.) | — | 0.10 |
| Total required energy, Portland cement | — | 2.35 |
| Total required energy, Portland cement, Geopolymer | — | 1.50 |

The binder is a fly ash-based geopolymer binder and as such, can include fly ash as a primary component. For instance, the binder can include fly ash in an amount such that the final cured concrete includes from about 300 $kg/m^3$ to about 500 $kg/m^3$ of the fly ash, for instance from about 300 $kg/m^3$ to about 400 $kg/m^3$ in some embodiments.

The fly ash of the binder can be any suitable fly ash (e.g., type F) as is known in the art and can be obtained from any source and optionally subjected to pre-treatment as is known prior to incorporation into a binder as disclosed. In one embodiment, the fly ash can be formed solely of the finely divided mineral residue resulting from the combustion of pulverized coal in coal-fired power plants. However, the fly ash is not limited to coal-produced fly ash and the term can generally refer to any suitable ash produced by the combustion of coal or other fuel materials, including but not limited to bark ash and bottom ash. The fly ash may also include a mixture of different ashes. In general, the fly ash can include inorganic, incombustible matter present in the coal or other fuel that has been fused during combustion into a glassy, part amorphous and part crystalline structure.

In formation, the fly ash material can be solidified while suspended in exhaust gases and can be collected by electrostatic precipitators or filter bags. Since the particles solidify while suspended in exhaust gases, fly ash particles are generally spherical in shape and can generally range in size from about 0.5 μm to about 100 μm. The fly ash particles can include primarily silicon dioxide ($SiO_2$), aluminum oxide ($Al_2O_3$) and iron oxide ($Fe_2O_3$), and hence, are a source of aluminum and silicon for the geopolymer binders. Fly ash of the binders can be of either class F or class C, based on the chemical composition of the fly ash as determined according to ASTM C 618.

The binder can also include sodium hydroxide, generally added in the form of sodium hydroxide flakes) as a component of the activating solution of the binder. The sodium hydroxide concentration in the activating solution and the binder can have a major effect on the compressive strength and as such, modification of the sodium hydroxide concentration can be utilized to modify and target the compressive strength of the concrete formed with the binders.

In one embodiment, the binder can incorporate the Portland cement in an amount of from about 5% to about 35% by weight of the fly ash, or from about 3% to about 10% by weight of the binder in some embodiments. In one embodiment, a binder can include sodium hydroxide in an amount of from about 2% to about 12% by weight of the binder to provide compressive strength values suitable for use in many civil engineering applications. For instance, the binder can include sodium hydroxide in an amount of from about 15 kg/m$^3$ to about 70 kg/m$^3$, or from about 15 kg/m$^3$ to about 50 kg/m$^3$ in some embodiments.

In addition to the sodium hydroxide component, an activating solution can include densified silica fume, also known as microsilica, (CAS number 69012-64-2, EINECS number 273-761-1). Silica fume is an amorphous (non-crystalline) polymorph of silicon dioxide. It can be in the form of an ultrafine powder as is known, for instance collected as a by-product of the silicon and ferrosilicon alloy production. In general, silica fume of the compositions can be in the form of spherical particles with an average particle diameter of from about 100 nm to about 200 nm, for instance about 150 nm.

Silica fume can generally be included in the binders in an amount of from about 2% to about 10% by weight of the fly ash, or from about 4% to about 10% by weight of the fly ash in some embodiments. For instance, the binder can include silica fume in an amount of from about 10 kg/m$^3$ to about 50 kg/m$^3$, or from about 10 kg/m$^3$ to about 40 kg/m$^3$ in some embodiments. By use of the silica fume, the compositions can in one embodiment be free of sodium silicates.

The binders can also include an amount of Portland cement, which can provide for desirable early and final compressive strength in the concretes formed with the binders, particularly when formed at ambient curing conditions. Without wishing to be bound to any particular theory, it is believed that the addition of Portland cement can improve compressive strength because it introduces calcium hydroxide, leading to acceleration in the geopolymerization process. In addition, an amount of Portland cement in the binder can react with free water present in a cement mixture, which can lead to a reduction in the formation of microcracks in an ambient cured concrete.

Beneficially, through inclusion of an amount of Portland cement in the binders, the concrete formed with the binder can exhibit desirable characteristics while decreasing the amount of sodium hydroxide necessary in the binder (discussed in more detail below). Moreover, inclusion of an amount of Portland cement can improve cure at low temperatures (e.g., ambient cure). These aspects can decrease the costs associated with the concrete. Portland cement can also provide extra alkalinity to the binder in the form of calcium hydroxide formed through reaction with water of the activating solution. Additionally, the permeable void ratio of the concrete can be affected by inclusion of Portland cement, with a significant reduction upon increase in the Portland cement content of the binder.

The binders can generally include Portland cement as a minor component of the binder relative to the fly ash. By way of example, the fly ash and Portland cement components of the binder can generally be present in a weight ratio of from about 95% fly ash to about 5% Portland cement to a weight ratio of about 65% fly ash to about 35% Portland cement. For instance, the weight ratio of fly ash to Portland cement can be from about 75:25 to about 90:10 in some embodiments. In one particular embodiment, the fly ash and Portland cement component of the binder can include 90 wt. % fly ash and 10 wt. % Portland cement, which can provide high early and final compressive strength, e.g. from about 5 MPa to about 7 MPa at day 1, from about 12 MPa to about 15 MP at day 3, and from about 55 MPa to about 60 MPa at day 28, as well as providing acceptable workability. For instance, the binder can include Portland cement in an amount from about 10 kg/m$^3$ to about 200 kg/m$^3$, or from about 70 kg/m$^3$ to about 170 kg/m$^3$ in some embodiments.

To utilize the disclosed binders, an activating solution including water, sodium hydroxide, and silica fume can be formed. For instance, the water can be included in the activating solution in an amount of from about 30% to about 50% by weight of the fly ash of the binder, for instance from about 150 kg/m$^3$ to about 200 kg/m$^3$ in some embodiments.

The activating solution can be combined with the remaining dry components of the concrete (e.g., the fly ash, the Portland cement, and the aggregate component) in a single or multi-step procedure. For instance, the fly ash and Portland cement can first be mixed, and this mixture can be combined with the aggregate component prior to combination with the activating solution. Following mixing, the wet concrete paste can be cured.

While the cure can be carried out in conjunction with application of external heat (e.g., at temperatures up to about 70° C., or even higher in some embodiments), in one particular embodiment, the concrete can be cured at ambient temperature. As discussed further in the examples section, through inclusion of an amount of Portland cement in the binders, early and final compressive strength can be quite high even in the case of ambient cure.

Even with ambient cure, the activating solution can function more efficiently in a hot weather climate. For instance, with ambient temperature between about 40° C. (104° F.) and about 45° C. (113° F.), a very high 7-day compressive strength can be achieved by inclusion of an amount of Portland cement in the binders. Of course, ambient cure can also be carried out at lower ambient temperatures.

Ambient cure of the concretes can be particularly beneficial in one embodiment, as this can allow for in situ formation and cure of the concrete at the location of use for the materials. In the past, geopolymer concretes have been limited to pre-cast concrete applications.

Compressive strengths of disclosed concretes can be suitable for most engineering applications within a short cure period and can be on a par with conventional concrete. Elimination of external heat application or reduction in external heat application can not only reduce the total cost of the fly ash-based geopolymer concrete as compared to previously known fly ash-based concretes, but it can also increase the number and amount of fly ash-based geopolymer concrete applications. In addition, the reduction of required external heat and the reduction of the amount of Portland cement included in comparison to traditional Portland cement concretes can also reduce $CO_2$ emissions.

The present disclosure may be better understood with reference to the Examples set forth below.

Example 1

Fly ash (ASTM Class F) obtained from Wateree Steam Station in South Carolina was used in all mixtures. The chemical composition was determined using X-Ray Fluorescence (XRF) (Table 2).

TABLE 2

| Chemical Analysis | wt. % |
| --- | --- |
| Silicon Dioxide | 53.5 |
| Aluminum Oxide | 28.8 |
| Iron Oxide | 7.47 |
| Sum of Silicon Dioxide, Aluminum Oxide | 89.8 |
| Calcium Oxide | 1.55 |
| Magnesium Oxide | 0.81 |
| Sulfur Trioxide | 0.14 |
| Loss on Ignition | 3.11 |
| Moisture Content | 0.09 |
| Total Chlorides | — |
| Available, Alkalies as $NaO_2$ | 0.77 |

Silica fume powder (Sikacrete 950DP, densified powder silica fume) was bought from a local supplier, and sodium hydroxide flakes (NaOH) with a purity of 97-98% were obtained from DudaDiesel. Local crushed granite coarse aggregate, (Vulcan Materials) in saturated surface dry condition, in addition to fine aggregate (Glasscock) were used; the gradations of coarse and fine aggregate are shown in Table 3. Super plasticizer (Sika ViscoCrete 2100) was used by 1.5% of the weight of fly ash to improve the workability of the concrete.

TABLE 3

| Chemical Analysis | wt. % |
| --- | --- |
| Silicon Dioxide | 53.5 |
| Aluminum Oxide | 28.8 |
| Iron Oxide | 7.47 |
| Sum of Silicon Dioxide, Aluminum Oxide | 89.8 |
| Calcium Oxide | 1.55 |
| Magnesium Oxide | 0.81 |
| Sulfur Trioxide | 0.14 |
| Loss on Ignition | 3.11 |
| Moisture Content | 0.09 |
| Total Chlorides | — |
| Available, Alkalies as $NaO_2$ | 0.77 |

| Sieve (mm) | Coarse aggregate % passing | Fine aggregate % passing |
| --- | --- | --- |
| 16.0 | 100 | 100 |
| 12.5 | 99.5 | 100 |
| 9.50 | 85.3 | 99.8 |
| 4.75 | 28.8 | 99.5 |
| 2.36 | 5.50 | 97.5 |
| 1.18 | 1.30 | 90.4 |
| 0.43 | 0.70 | 37.2 |
| 0.30 | 0.70 | 19.6 |
| 0.15 | 0.50 | 1.61 |
| Pan | 0.00 | 0.00 |

Scanning Electron Microscopy (SEM) was used to observe the microstructure, microcracks and voids. SEM imaging was performed at the Electron Microscopy Center (EMC) at the University of South Carolina. The absorption, density, and ratio of permeable voids were measured according to the ASTM C 642-06 procedure. The mixture proportions and terminology for a reference fly ash-based geopolymer concrete (FGC) and paste (FGP) that include silica fume are shown in Table 4.

TABLE 4

| Concrete type | Fly ash, $kg/m^3$ ($lb/ft^3$) | Water, $kg/m^3$ ($lb/ft^3$) | w/c % | Sodium hydroxide, $kg/m^3$ ($lb/ft^3$) | Silica fume, $kg/m^3$ ($lb/ft^3$) | Coarse agg., $kg/m^3$ ($lb/ft^3$) | Fine agg., $kg/m^3$ ($lb/ft^3$) | SP % of fly ash**** |
| --- | --- | --- | --- | --- | --- | --- | --- | --- |
| FGC*-silica fume** | 474 (29.6) | 163 (10.2) | 28 | 61.6 (3.81) | 46.2 (2.92) | 793 (49.5) | 793 (49.5) | 1.50 |
| FGP-silica fume *** | 474 (29.6) | 163 (10.2) | 28 | 61.6 (3.81) | 46.2 (2.92) | — | — | — |

*FGC: fly ash-based geopolymer concrete
**FGC-silica fume: the activating solution is a combination of silica fume and sodium hydroxide
*** FGP-silica fume: fly ash-based geopolymer paste, the activating solution is a combination of silica fume and sodium hydroxide
****SP = Super plasticizer To form the activating solutions, sodium hydroxide flakes were dissolved in distilled water and stirred for three minutes, silica fume powder was added, and the solution was mixed for another five minutes. The mixing of sodium hydroxide, water, and silica fume resulted in an exothermic reaction, raising the mixing temperature to about 80° C. (176° F.). Once the mixing process was complete, the activating solution was heated overnight in an oven at 75° C. (167° F.) to ensure that the sodium hydroxide solution and silica fume powder were completely dissolved.

To form the concretes, the saturated surface dry gravel and fine aggregates were measured and mixed with dry fly ash for three minutes. These dried materials were then mixed with the activating solution for another five minutes. The mixture procedure was performed according to standard practice, and 75×152 mm (3×6 in) plastic molds were used according to ACI 211.1-91. All specimens were then vibrated for 20 seconds and kept at ambient conditions for two days. Thereafter, all specimens were kept in an oven for two days, unless otherwise stated.

The compressive strength test results along with other identifiers are shown in Table 5. The specimen type includes the external temperature used during cure (e.g. TM25—25° C. external temperature), the sodium hydroxide amount relative to the reference material of Table 4 (e.g., Na100%—61.6 $kg/m^3$ sodium hydroxide content) and the amount of Portland cement added as replacement for a portion of the fly ash (e.g., PC0—no fly ash was replaced with Portland cement—474 kg/m³ fly ash per Table 3).

TABLE 5

| Specimens type | External temperature, ° C. (° F.) | NaOH/ binder weight ratio, % | Portland cement replacement ratio % | 7 days compressive strength, MPa*(psi)* | 28 days compressive strength, MPa (psi)* | Standard deviation, MPa (psi)* |
|---|---|---|---|---|---|---|
| Tm25-Na100%-PC0 | 25.0 (77.0) | 10.6 | 0 | 30.3 (4,400) | — | 2.55 (370) |
| Tm35-Na100%-PC0 | 35.0 (95.0) | 10.6 | 0 | 30.1 (4,800) | — | 3.72 (540) |
| Tm45-Na100%-PC0 | 45.0 (113) | 10.6 | 0 | 68.5 (9,930) | — | 1.17 (170) |
| Tm70-Na100%-PC0 | 70.0 (158) | 10.6 | 0 | 101 (14,700) | — | 4.96 (720) |
| Tm70-Na25%-PC0 | 70.0 (158) | 2.65 | 0 | 0 | — | 0 |
| Tm70-Na50%-PC0 | 70.0 (158) | 5.30 | 0 | 11.7 (1,700) | — | 0.27 (40) |
| Tm70-Na75%-PC0 | 70.0 (158) | 7.95 | 0 | 54.5 (7900) | — | 1.52 (220) |
| Tm70-Na100%-PC0 | 70.0 (158) | 10.6 | 0 | 101 (14,700) | — | 4.96 (720) |
| Tm23-Na100%-PC0 | 23.0 (73.4) | 10.6 | 0 | 4.21 (610) | 27.2 (3,940) | 2.14 (310) |
| Tm23-Na100%-PC5% | 23.0 (73.4) | 10.6 | 5 | 17.8 (2,580) | 53.3 (7,730) | 1.72 (250) |
| Tm23-Na100%-PC10% | 23.0 (73.4) | 10.6 | 10 | 24 3 (480) | 57.4 (8,320) | 2.07 (300) |
| Tm23-Na100%-PC15% | 23.0 (73.4) | 10.6 | 15 | 21.9 (3,180) | 64.3 (9,330) | 1.65 (240) |

To measure the effect of external heat, 16 samples were tested to investigate the effect of external temperature on concrete in which the activating solution was a combination of silica fume and sodium hydroxide. The reference mixture including proportions as are indicated in Table 3 was used and temperatures of 70° C. (158° F.), 45° C. (113° F.), 35° C. (95° F.), and 25° C. (77° F.) were chosen. The samples were kept at ambient conditions for two days after mixing and then were put in an oven at the designated temperature for an additional two days. The samples were removed from the oven and kept at ambient temperature until the compressive strength test was completed. The compressive test was done after 7 days according to ASTM C39, and the test results are shown in FIG. 1. As shown, when the external temperature dropped from 70° C. (158° F.) to 25° C. (77° F.), the compressive strength dropped by 70%. By comparing the compressive strength of the samples at 45° C. (113° F.) and 25° C. (77° F.), the compressive strength increased by 55% at the 45° C. (113° F.) temperature.

To determine the effect of sodium hydroxide concentration on the concrete, four different mixtures with different sodium hydroxide concentrations were investigated. Other than the amount of sodium hydroxide, all other materials proportions including fly ash, water, heat, silica fume, and aggregate were kept the same. Four samples were cast for each mix and the samples were kept in the lab for two days. The samples were then exposed to an external temperature of (75° C./167° F.) for an additional two days, and the compressive test was performed at seven days. The weight of sodium hydroxide and other mixture proportions of Table 4 were considered as a reference (sodium hydroxide/binder ratio of 10.6%).

Figure 2:
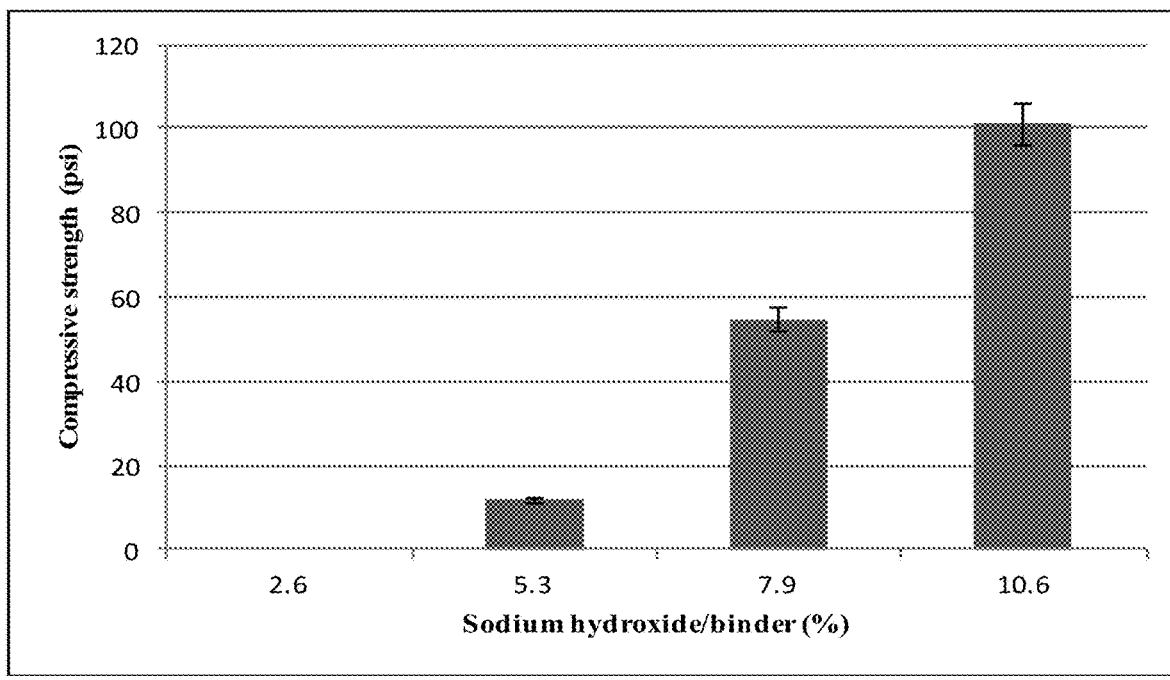
FIG. 2 illustrates the effect of sodium hydroxide content in an activating solution on compressive strength.

The results are shown in FIG. 2. As shown, the compressive strength of the concrete was decreased by 100% when the weight ratio of sodium hydroxide to binder (including fly ash, silica fume, and sodium hydroxide) ratio was decreased by 75% from the reference value of 10.6% (i.e., NaOH: binder ratio decreased to 2.6%). When the binder composition included 75% of sodium hydroxide by weight (i.e., NaOH:binder ratio decreased to 7.9%), the compressive strength was around 54.5 MPa (7900 psi), which is a suitable compressive strength for several civil engineering applications. When using only 50% of the sodium hydroxide to binder ratio as compared to the reference amount of Table 3 (i.e., a sodium hydroxide to binder ratio of 5.3%), the compressive strength was low, around 14 MPa (2000 psi).

The compressive strength reduction at lower sodium hydroxide concentrations was postulated to be due to the lack of activation of fly ash due to the lack of chemical interaction with the sodium hydroxide. Thus, the amount of sodium hydroxide in the activating solution can be varied depending on the required compressive strength.

Figure 3:
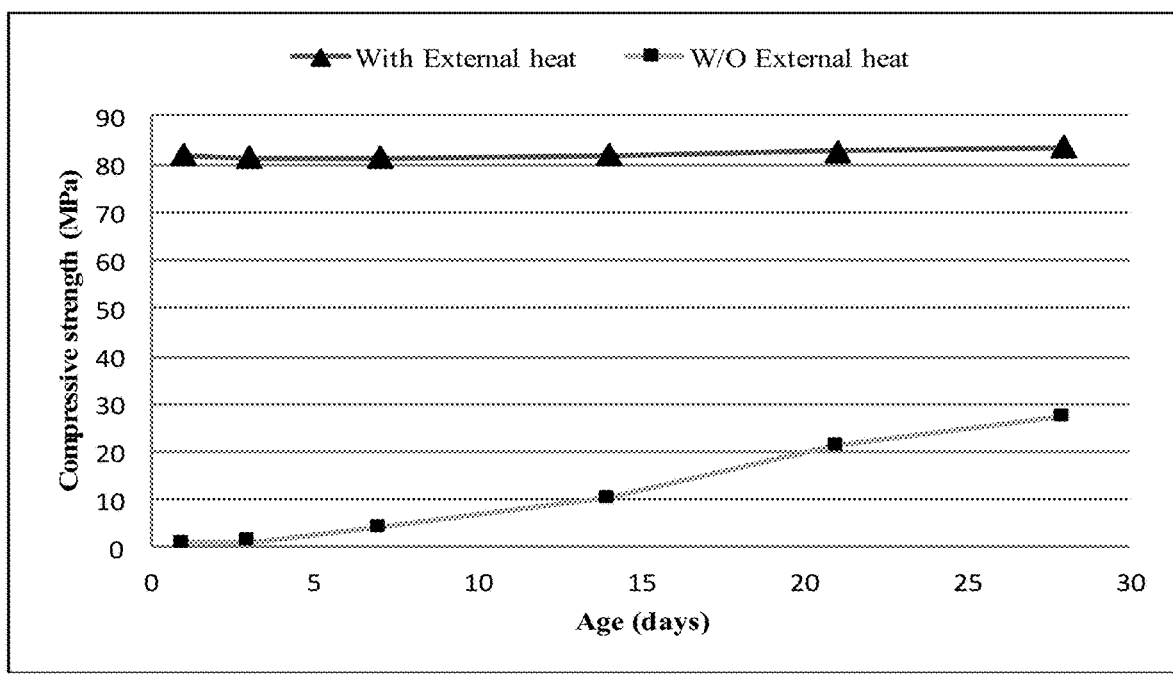
FIG. 3 illustrates the effect of external heat during cure on the compressive strength of concretes formed with an activating solution as described.

To determine the effect of external heat on the compressive strength gain, two different sets of experiments were conducted. The first set of experiments investigated the compressive strength gains of concretes formed with the disclosed activating solutions (water, sodium hydroxide, and silica fume) with and without external heat; temperatures of 75° C. (167° F.) and ambient lab temperature, approximately 21° C. (69.8° F.). For each group of experiments, four samples were tested at each compressive strength test at intervals of 1, 3, 7, 14, 21, and 28 days, for a total of 24 samples. The compressive strength results are shown in FIG. 3, and it shows there was a distinctive compressive strength reduction when external heat was not used. At 1, 3, and 7 days, the differences between the compressive strength of the samples cured with and without external heat were 95, 98, and 99% respectively. In addition, it can be understood that using external heat accelerates the hydration process. For instance, a compressive strength of 82.7 MPa (12,000 psi) in one day was able to be achieved in the illustrated example.

Figure 4:
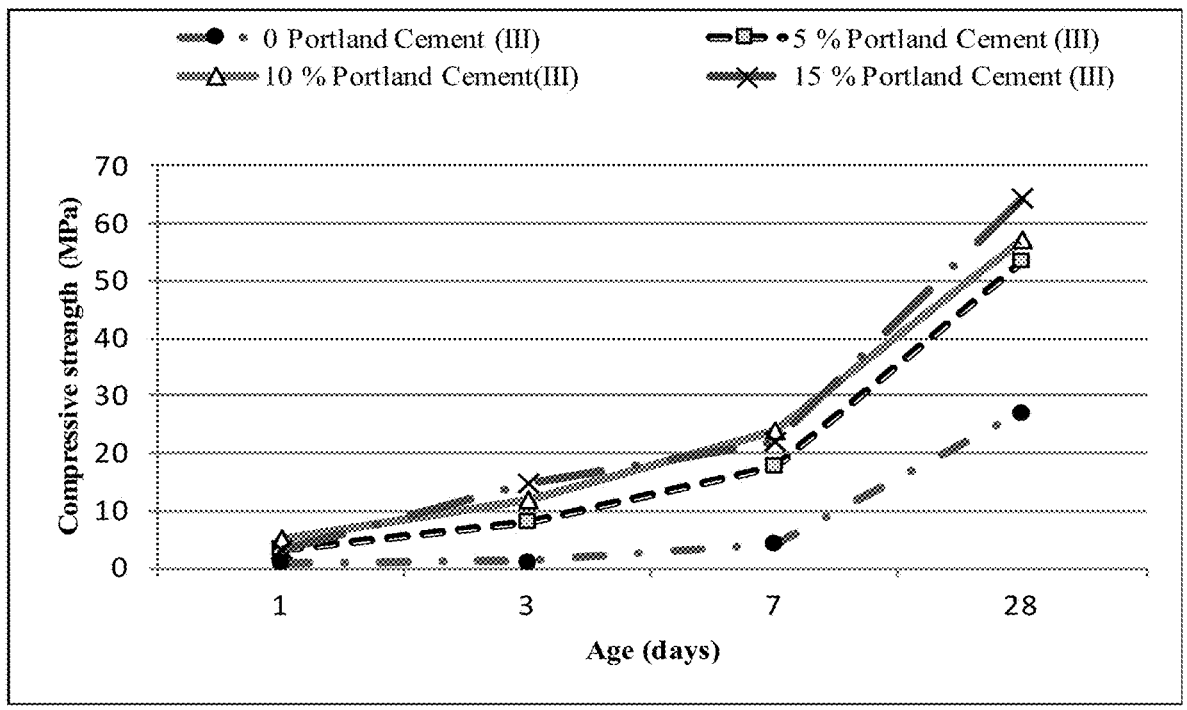
FIG. 4 illustrates the effect of Portland cement inclusion on compressive strength for concretes formed as described herein.

Following, Portland cement type (III) sourced from Holcim was used as partial replacement of fly ash, ranging at 5, 10, or 15% weight of fly ash of the reference composition (Table 4). The compressive strength tests were conducted at 1, 3, 7, 14 and 28 days, and the mixing procedure was according to the procedure described above. The samples were cured in ambient conditions. The results are shown in Table 6 and FIG. 4.

TABLE 6

| Fly ash weight % | Portland cement weight % | 1 day compressive strength*, MPa (psi) | 3 days compressive strength*, MPa (psi) | 7 days compressive strength*, MPa (psi) | 28 days compressive strength*, MPa (psi) |
|---|---|---|---|---|---|
| 100 | 0 | 0.89 (130) | 1.17 (170) | 4.21 (610) | 27.2 (3,940) |
| 95 | 5 | 3.31 (480) | 7.79 (1,130) | 17.8 (2,580) | 53.3 (7,730) |
| 90 | 10 | 5.01 (740) | 11.9 (1,730) | 24.0 (3,480) | 57.4 (8,320) |
| 85 | 15 | 3.37 (490) | 14.9 (2,160) | 21.9 (3,180) | 64.3 (9,330) |

For comparison, the 15% Portland cement replacement concrete was considered as the reference material. As shown, the early compressive strength of the 15% Portland cement samples at 1 day was improved by more than 50% compared with the concretes that did not contain Portland cement. The three-day compressive strength differences between 0, 5, and 10% of Portland cement replacement were 92.1, 47.7, and 20.1% respectively compared to the 15% PC values. Moreover, the differences started to be significant at seven days compressive strength, such as 81.7, 18.7, and −0.95% for 0, 5, and 10% respectively. The compressive strength differences at 28 days were 58, 17, and 11% for the 0, 5, and 10% of Portland cement replacements as compared to the 15% replacement value. Thus, the cement replacement improved the early strength gains for all the percentages, as well as the final strength at 28 days; however, using Portland cement did reduce the workability.

Figure 5:
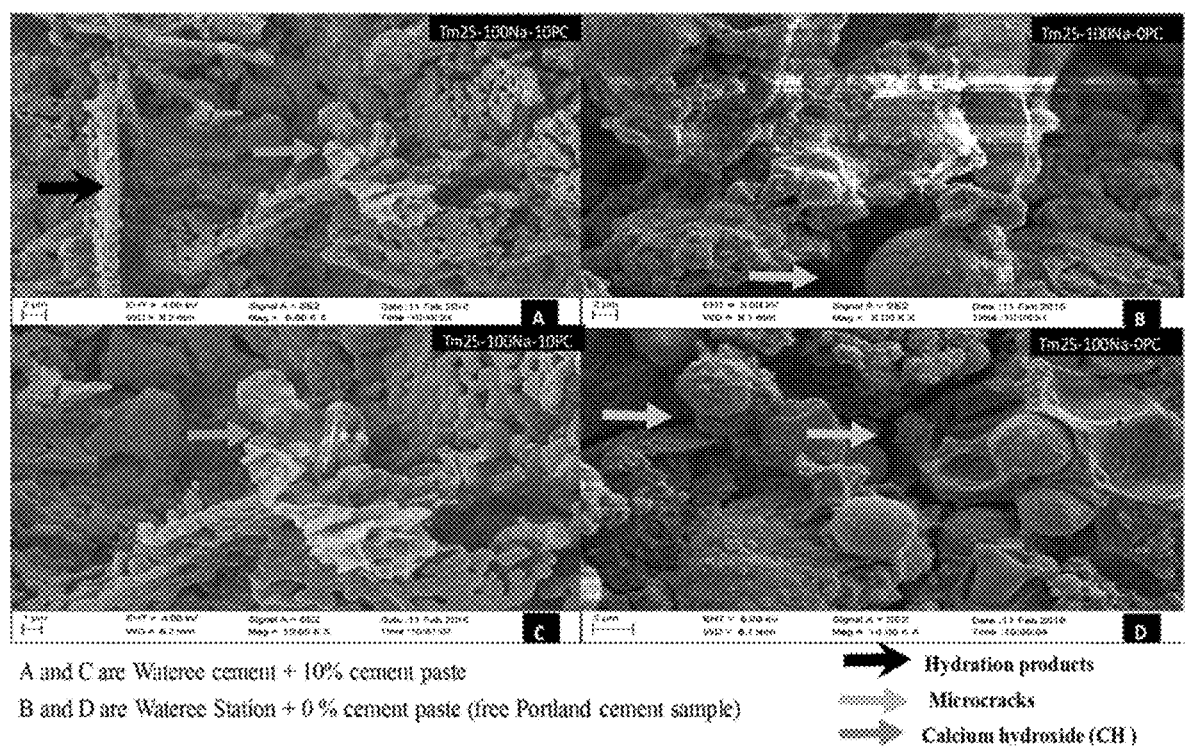
FIG. 5 provides scanning electron microscope (SEM) images of cement pastes (7 days) including images of voids, cracks, and unreacted fly ash.

The fly ash-based geopolymer silica fume-based paste samples (FGP-silica fume) were cast as described above. The activating solution was formed as described and was then mixed with the Wateree Station fly ash. In one of the samples, 10% of fly ash was replaced by an equivalent amount of Portland cement. A Portland cement-free sample including the components as described in Table 3 and a similar sample including 10% of the fly ash replaced with Portland cement, were kept at 25° C. until the SEM observation was performed. The SEM observation results at 7 days are shown in FIG. 5, and 14 days later at 21 days in FIG. 6. Panels A and C are images of the 10% Portland cement replacement sample and panels B and D are images from the Portland cement-free sample. From panel A in FIG. 5, it is observed that the fly ash particles are surrounded and covered with Calcium Silicate Hydrate C—S—H (products of hydrated Portland cement). The reaction in the fly ash-based geopolymer paste-silica fume was still continuing at this point and the reaction was not yet completed, unlike the Portland cement hydrations which are considered mature as the reaction is faster than in the sample that contained no Portland cement (in the absence of external heat). There are also a significant number of microcracks visible in the sample with no Portland cement (panels B and D) compared to the 10% Portland cement sample (panels A and C) in FIG. 5 and FIG. 6. This suggests that the presence of microcracks in the Portland cement-free sample can be attributed to expelled water. Expelled water leads to a volume reduction in the Portland cement-free sample and as a result, microcracks can occur upon evaporation of the expelled water.

As shown in reactions 1 and 2 below, hydration products such as $C_3S$ and $C_2S$, representing the majority of Portland cement compounds, can utilize expelled water to produce calcium silicate hydrate (C—S—H) and calcium hydroxide (CH). These reactions not only utilize the expelled water, which then reduces microcrack formation as shown in panels A and C in FIG. 5 and FIG. 6, but can also produce extra alkali (calcium hydroxide), which enhances unreacted fly ash reaction.

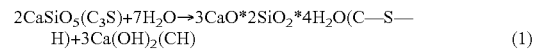

$$2CaSiO_5(C_3S)+7H_2O \rightarrow 3CaO*2SiO_2*4H_2O(C-S-H)+3Ca(OH)_2(CH) \quad (1)$$

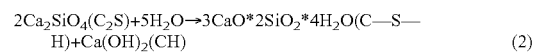

$$2Ca_2SiO_4(C_2S)+5H_2O \rightarrow 3CaO*2SiO_2*4H_2O(C-S-H)+Ca(OH)_2(CH) \quad (2)$$

Figure 6:
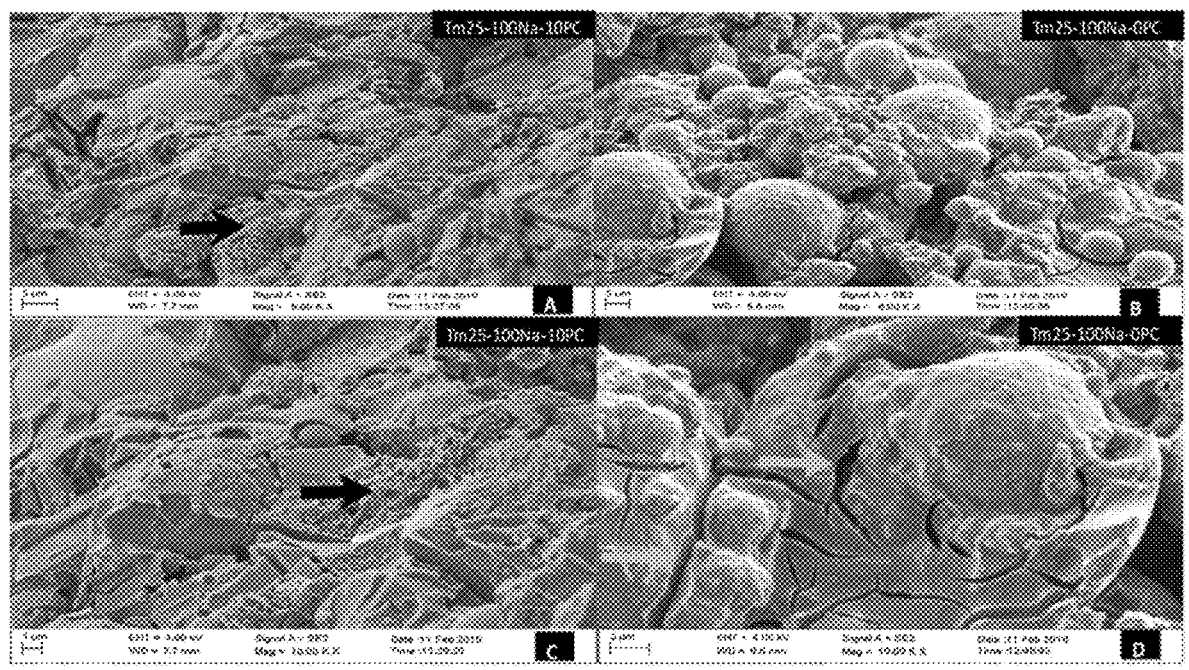
FIG. 6 provides SEM images of cement paste (14 days) showing voids, cracks, and unreacted fly ash.

Compared to the paste that is free of Portland cement (panels B and D in FIG. 5 and FIG. 6), the samples that included an amount of Portland cement as replacement of a portion of the fly ash (panels A and C in FIG. 5 and FIG. 6) appears to contain more unreacted fly ash particles, which probably contributed to the low early and final compressive strength. Panels A and C in FIG. 6 show that the hydration process is more mature and the sample appears free of voids and microcracks when compared with panels A and C in FIG. 5. The comparison between images C and D in FIG. 5 confirms that the 10% Portland cement replacement sample has some unreacted fly ash and cement particles, which may have an effect on the seven-day compressive strength and microcracking. For the Portland cement-free sample, the unreacted fly ash particles may be due to lack of external heat.

The addition of some Portland cement can improve the early strength in absence of external heat because Portland cement reacts faster than fly ash as is demonstrated in panels A and C in FIG. 5 and FIG. 6. The rapid Portland hydration may provide heat for accelerating fly ash reactions and as a result, may improve the early and final compressive strength. In addition, as shown in the above reaction schemes, Portland cement requires water to begin the hydration reaction. The additional presence of Portland cement can thus consume expelled water from the geopolymerization process. Utilizing the expelled water may reduce the microcracks due to relatively low volume reduction. The produced calcium hydroxide (CH) may react with free fly ash particles and increase rate of geopolymerization process leading to enhancing the early and final compressive strength. In FIG. 6, four different images for the same sample after 14 days were captured, the samples appeared to be farther matured and had higher hydration and geopolymerization products compared with the samples of FIG. 5. In addition, ettirngite Portland cement products were fewer and almost completely dissolved in the fly ash and activating solution products.

Tests were carried out to investigate the effect of the combinations of different Portland cement (Type III) replacements on absorption and void space presence in the concrete products. In cases in which 0, 5%, 10%, and 15% of the fly ash of the binder as described in Table 3 was replaced with Portland cement, characterization of the absorption and total permeable void space was conducted to identify the relationship between the compressive strength and the total permeable void space. The Portland cement (Type III) replacement of fly ash combinations are shown in Table 7, and the experiment was conducted according to ASTM C 642-06. Four samples were cast for each set, and the samples were tested at 28 days. Table 7 tabulates the descriptions of each mixtures and their bulk and apparent density, absorption after immersion, volume of permeable ratio, and 28-day compressive strength results.

TABLE 7

| Specimens type | Portland cement replacement | Bulk density* (dry) g/cm³ (lb/ft³) | Apparent density* | Absorption after immersion* % | Volume of permeable pore space* (%) | Compressive strength*, MPa (psi) |
| --- | --- | --- | --- | --- | --- | --- |
| Tm23-Na100%-PC0 | 0 | 135 (2.16) | 156 (2.51) | 5.80 | 13.7 | 27.2 (3,940) |
| Tm23-Na100%-PC5 | 5 | 135 (2.17) | 156 (2.50) | 5.10 | 13.3 | 53.3 (7,730) |
| Tm23-Na100%-PC10 | 10 | 136 (2.18) | 57.1 (2.52) | 4.90 | 12.9 | 57.4 (8,320) |
| Tm23-Na100%-PC15 | 15 | 137 (2.19) | 156 (2.51) | 4.70 | 12.8 | 64.3 (9,330) |

Figure 7:
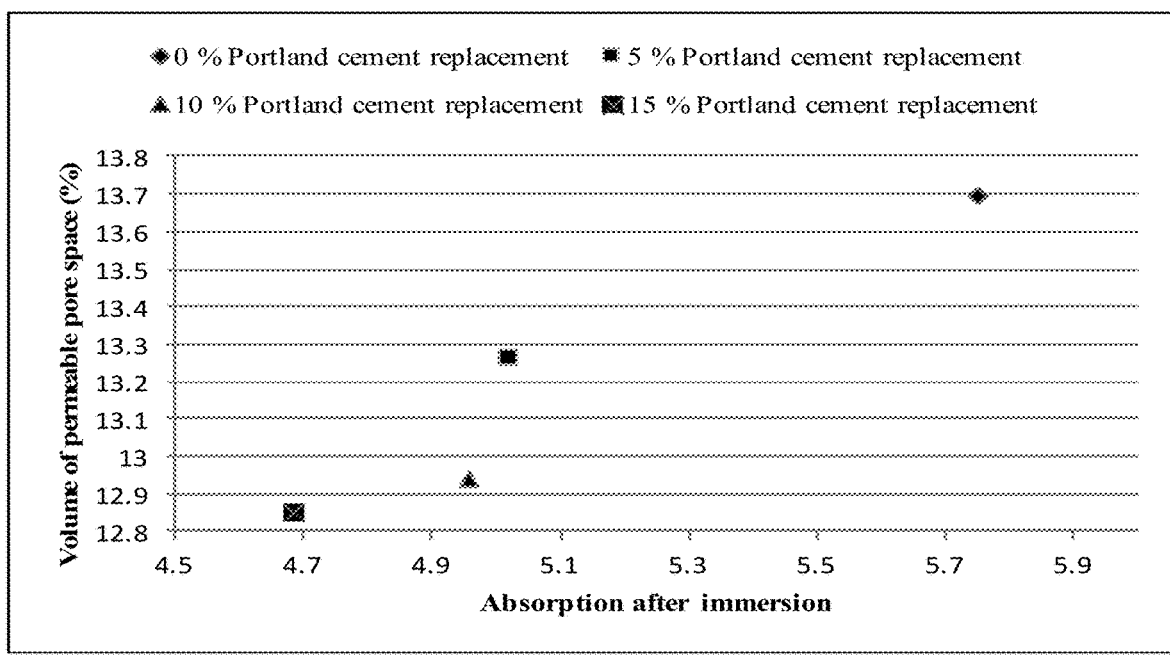
FIG. 7 presents the average volume of permeable pore space and absorption after immersion for various concrete samples described further herein.
Figure 8:
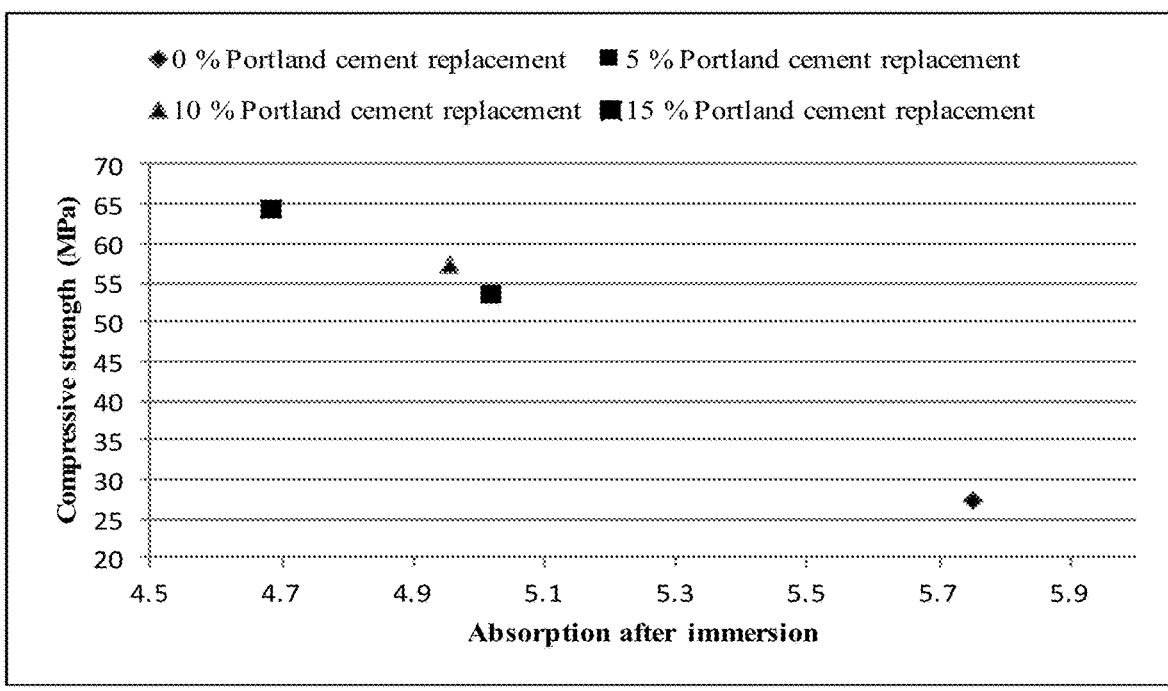
FIG. 8 presents the average absorption after immersion ratio and compressive strength correlation for various concrete samples described further herein.

It can be noted that using Portland cement reduced the volume of permeable void ratio and absorption after immersion, as shown in FIG. 6. In comparing 15% Portland cement replacement with no replacement, the volume of permeable void ratio was decreased by 7.03%. In addition, the absorption after immersion was reduced by 18.9%. These ratios show that the permeable void and immersion ratios were decreased significantly through addition of some Portland cement to the binder, which can lead to the improvement of the durability of fly ash-based geopolymer concrete. Since FGC-silica fume has similar or less volume of permeable pores in comparison to conventional concrete, this comparison shows that FGC-silica fume durability can be a competitive alternative for Portland cement concrete. FIG. 7, FIG. 8, and Table 7 show a correlation between absorption after immersion and compressive strength. When comparing the 15% Portland cement replacement sample to no replacement, the rate of absorption after immersion ratio was increased by 18.9% and the compressive strength was decreased by 57.6%. In addition, the bulk and apparent density were increased when an amount of Portland cement was used. This makes sense as the density of Portland cement is higher than fly ash and it has a smaller void ratio.

Example 2

Three geopolymer mixes were formed as described in Table 8. In the following discussion, the control mix was considered to have 100% sodium hydroxide, and 100% silica fume concentration. The other mixes in the table included 75%, 50%, and 25% of the control mix amounts of sodium hydroxide and silica fume, respectively. These mixes also include an amount of Portland cement that was added as sodium hydroxide concentrations were decreased, as shown. The amount of Portland cement is provided as a percentage of the fly ash amount in the control mix.

TABLE 8

| Concrete type | Fly ash, kg/m³ (lb/ft³) | Water, kg/m³ (lb/ft³) | w/c % | Sodium hydroxide, kg/m³ (lb/ft³) | Silica fume, kg/m³ (lb/ft³) | Coarse agg., kg/m³ (lb/ft³) | Fine agg., kg/m³ (lb/ft³) | SP % of fly ash | Portland Cement (kg/m³) |
| --- | --- | --- | --- | --- | --- | --- | --- | --- | --- |
| Controlled mix 0PC-100SH-100SF | 474 (29.6) | 163 (10.2) | 28.0 | 61.6 (3.81) | 46.2 (2.92) | 793 (49.5) | 793 (49.5) | 1.50 | 0 |
| 15% PC-75% SH-75% SF | 403 (25.2) | 155 (9.71) | 26.6 | 46.2 (2.85) | 34.6 (2.19) | 793 (49.5) | 793 (49.5) | 1.50 | 71 15% |
| 25% PC-50% SH-50% SF | 356 (22.2) | 155 (9.71) | 26.6 | 30.8 (1.91) | 23.1 (1.46) | 793 (49.5) | 793 (49.5) | 1.50 | 119 25% |
| 35% PC-25% SH-25% SF | 308 (19.2) | 155 (9.71) | 26.6 | 15.4 (0.95) | 11.6 (0.73) | 793 (49.5) | 793 (49.5) | 1.50 | 166 35% |

Table 9 presents the 7-day compressive strength and fuel usage of the mixes described in Table 8 and Table 10 presents the 28-day data.

TABLE 9

| Concrete type | Fly ash, kg/m³ (lb/ft³) | Water, kg/m³ (lb/ft³) | w/c % | Sodium hydroxide, kg/m³ (lb/ft³) | Silica fume, kg/m³ (lb/ft³) | Coarse agg., kg/m³ (lb/ft³) | Fine agg., kg/m³ (lb/ft³) | SP % of fly ash | Portland Cement (kg/m³) |
| --- | --- | --- | --- | --- | --- | --- | --- | --- | --- |
| Controlled mix 0PC-100SH-100SF | 474 (29.6) | 163 (10.2) | 28.0 | 61.6 (3.81) | 46.2 (2.92) | 793 (49.5) | 793 (49.5) | 1.50 | 0 |
| 15% PC-75% SH-100% SF | 474 (29.6) | 155 (9.71) | 26.6 | 46.2 (2.85) | 46.2 (2.92) | 793 (49.5) | 793 (49.5) | 1.50 | 0 |
| 25% PC-50% SH-100% SF | 474 (29.6) | 155 (9.71) | 26.6 | 30.8 (1.91) | 46.2 (2.92) | 793 (49.5) | 793 (49.5) | 1.50 | 0 |
| 35% PC-25% SH-100% SF | 474 (29.6) | 155 (9.71) | 26.6 | 15.4 (0.95) | 46.2 (2.92) | 793 (49.5) | 793 (49.5) | 1.50 | 0 |

TABLE 10

| Sodium hydroxide reduction, % | Silica fume reduction, % | Average compressive strength, MPa (psi) | Fuel energy (GJ/m³) |
|---|---|---|---|
| 0 | 0 | 27.2 (3,940) | 1.31 |
| 25 | 25 | 29.2 (4,230) | 1.37 |
| 50 | 50 | 29.2 (4,240) | 1.29 |
| 75 | 75 | 15.6 (2,270) | 1.22 |

Figure 9:
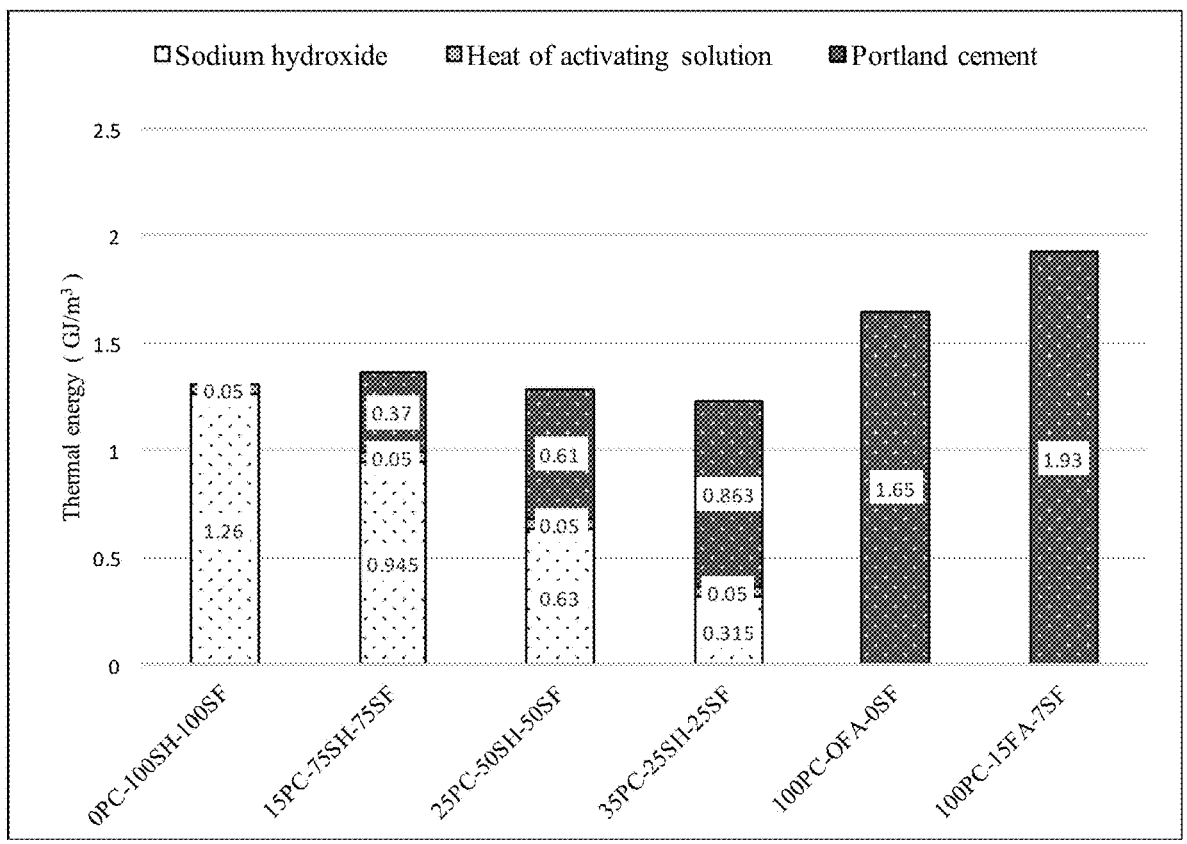
FIG. 9 compares thermal energy for concretes as described herein with Portland cement concretes having similar compressive strengths.

By considering the control mix as a reference, the fuel usage at 28 days was 1.37 GJ/m³, 1.29 GJ/m³, and 1.22 GJ/m³ for the mixes respectively, while it was 1.31 GJ/m³ for the control mix. The 28-day fuel usage of each sample is shown in FIG. 9 as are fuel usage for Portland cements having similar compressive strengths. As shown, fuel usage had a slight reduction in the mixes as compared with the control mix; however, it was lower than the corresponding Portland cement mixes by at least 50%.

Table 11 provides the parameters of the comparison Portland cement mixes. As shown, one of the comparison materials had zero fly ash, while the other included 15 wt. % fly ash and 7.wt. % silica fume.

TABLE 11

| Materials | 100PC-0FA-0SF kg/m³ (lb/ft³) [1] | 100PC-15FA-7SF kg/m³ (lb/ft³) [2] |
|---|---|---|
| Portland cement I | 335 (20.9) | 392 (24.5) |
| Fly ash | 0.00 | 80.1 (5.01) |
| Silica fume | 0.00 | 38.6 (2.41) |
| 28 Day Compressive strength MPa (psi) | 35.1 (5,070) | 33.2 (4820) |
| Fuel energy (GJ/m³) | 1.65 | 1.93 |

Figure 10:
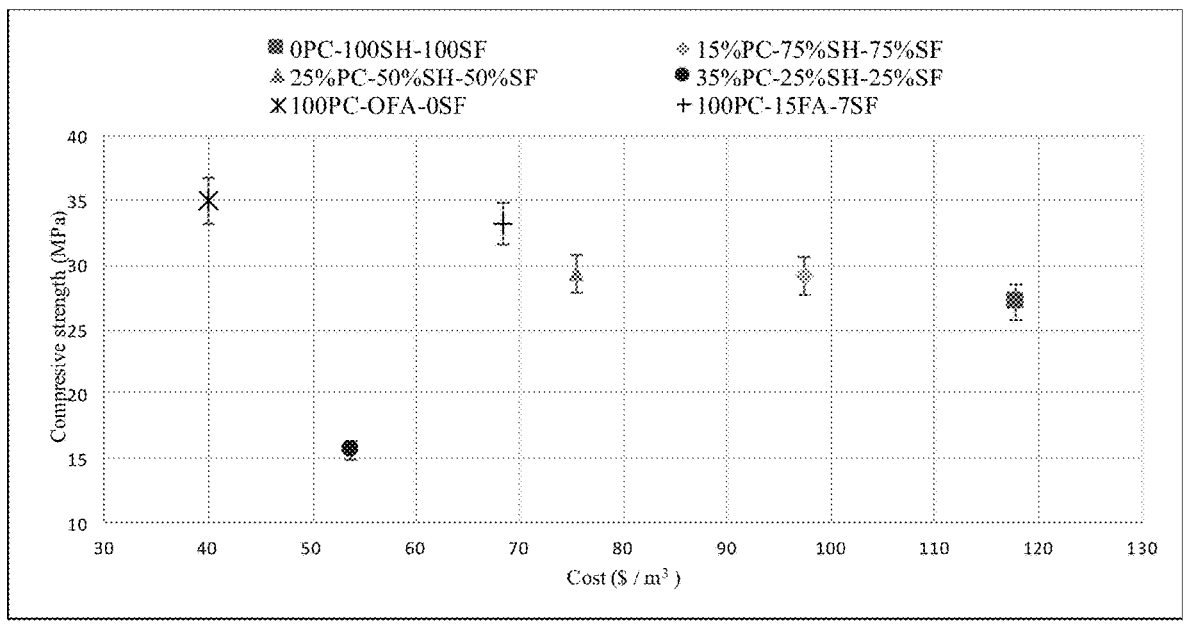
FIG. 10 presents compressive strength versus cost for concretes as described herein and compares those values with Portland cement concretes having similar compressive strength.

As shown in FIG. 10, the 28-day compressive strengths were 27.0 MPa (3,920 psi), 29.2 MPa (3,920 psi), 29.1 MPa (3,920 psi), 15.2 MPa (2,180 psi) for the mixes described in Table 8. Two of the mixes in particular show competitive cost as well as lower fuel usage in comparison with the Portland cement mix cost and fuel usage. As shown, the mixes of Table 8, which were cured in absence of external heat, were reduced in cost as compared to typical heat-cured geopolymer concrete. As compared to the controlled mix as a reference, the cost reduction was 17%, 35%, and 55% for the 25%, 50% and 75% sodium hydroxide replacement mixes, respectively at costs at the time of the examples.

The geopolymer concrete had another advantage in that 90% of the final compressive strength could be achieved within 24 hours in the presence of external heat. The durability, fire resistance, and performance can also be superior in comparison with Portland cement.

While certain embodiments of the disclosed subject matter have been described using specific terms, such description is for illustrative purposes only, and it is to be understood that changes and variations may be made without departing from the spirit or scope of the subject matter.

What is claimed is:

1. A fly ash-based geopolymer concrete binder comprising fly ash in an amount of from about 300 kg/m³ to about 500 kg/m³, sodium hydroxide in an amount of from about 5% to about 13% by weight of the fly ash, silica fume in an amount of from about 2% to about 10% by weight of the fly ash, and Portland cement, the weight ratio of the fly ash to the Portland cement being from about 95:5 to about 65:35.

2. The fly ash-based geopolymer concrete binder of claim 1, wherein the weight ratio of the fly ash to the Portland cement is from about 75:25 to about 90:10.

3. The fly ash-based geopolymer concrete binder of claim 1, wherein the fly ash is Class F fly ash as determined according to ASTM C 618.

4. A fly ash-based geopolymer concrete comprising a cured binder and aggregate, the cured binder comprising a reaction product of from about 300 kg/m³ to about 500 kg/m³ fly ash, sodium hydroxide, silica fume, and Portland cement.

5. The fly ash-based geopolymer concrete of claim 4, the cured binder comprising the reaction product of the fly ash, the sodium hydroxide in an amount of from about 5% to about 13% by weight of the fly ash, the silica fume in an amount of from about 4% to about 10% by weight of the fly ash, and the Portland cement, the weight ratio of the fly ash to the Portland cement being from about 95:5 to about 65:35.

6. The fly ash-based geopolymer concrete of claim 4, the concrete having a 28-day compressive strength as determined according to ASTM C39 of about 15 MPa or greater.

7. The fly ash-based geopolymer concrete of claim 4, the concrete having a fuel usage of about 1 GJ/m³ or greater.

8. The fly ash-based geopolymer concrete of claim 4, the aggregate comprising a mixture of fine aggregate and coarse aggregate.

9. The fly ash-based geopolymer concrete of claim 4, the cured binder comprising the reaction product of from about 15 kg/m³ to about 70 kg/m³ of the sodium hydroxide.

10. The fly ash-based geopolymer concrete of claim 4, the cured binder comprising the reaction product of from about 10 kg/m³ to about 50 kg/m³ of the cured binder.

11. The fly ash-based geopolymer concrete of claim 4, the cured binder comprising the reaction product of from about 10 kg/m³ to about 200 kg/m³ of the Portland cement.

12. A method for forming a fly ash-based geopolymer concrete, the method comprising:
    combining sodium hydroxide flakes, silica fume powder, and water to form an activating solution;
    combining the activating solution with from about 300 kg/m³ to about 500 kg/m³ fly ash and Portland cement to form a binder paste;
    combining the binder paste with aggregate to form a concrete; and
    curing the concrete at ambient conditions.

13. The method of claim 12, wherein the concrete is cured in situ at a site of utilization of the concrete.

14. The method of claim 12, wherein the activating solution, the fly ash, the Portland cement, and the aggregate are combined in a single step.

15. The method of claim 12, the activating solution including the sodium hydroxide in an amount of from about 5% to about 13% by weight of the fly ash.

16. The method of claim 12, the activating solution including the silica fume in an amount of from about 4% to about 10% by weight of the fly ash.

17. The method of claim 12, wherein the weight ratio of the fly ash to the Portland cement is from about 95:5 to about 65:35.

18. The method of claim 12, wherein the water is incorporated in the activating solution an amount of from about 30% to about 50% by weight of the fly ash.

19. A fly ash-based geopolymer concrete binder comprising fly ash in an amount of from about 300 kg/m$^3$ to about 500 kg/m$^3$, sodium hydroxide in an amount of from about 15 kg/m$^3$ to about 70 kg/m$^3$, silica fume in an amount of from about 10 kg/m$^3$ to about 50 kg/m$^3$, and Portland cement in an amount of from about 10 kg/m$^3$ to about 200 kg/m$^3$.

\* \* \* \* \*